United States Patent [19]

McMillin et al.

[11] 4,138,941

[45] Feb. 13, 1979

[54] CONTINUOUS GRAVITY FED CAN PRINTER AND TRANSFER APPARATUS

[75] Inventors: Danny L. McMillin, Golden, Colo.; Enn Sirvet, Washington Township, Bergen County, N.J.

[73] Assignee: Coors Container Company, Golden, Colo.

[21] Appl. No.: 801,595

[22] Filed: May 31, 1977

Related U.S. Application Data

[63] Continuation of Ser. No. 619,597, Oct. 6, 1975, abandoned.

[51] Int. Cl.$^2$ .................. B41F 17/20; B65G 47/91

[52] U.S. Cl. .................. 101/40; 101/426; 198/480; 198/482; 198/562; 198/689; 214/1 BV

[58] Field of Search .............. 101/40, 39, 38 A, 38 R, 101/426; 198/480, 478, 482, 689, 562, 540; 214/1 B, 1 BS, 1 BV

[56] References Cited

U.S. PATENT DOCUMENTS

| | | | |
|---|---|---|---|
| 2,326,850 | 8/1943 | Gladfelter et al. | 101/40 |
| 2,339,008 | 1/1944 | Gladfelter et al. | 101/40 UX |
| 2,399,630 | 5/1946 | Friden | 101/40 |
| 3,231,061 | 1/1966 | Borkmann | 198/480 |
| 3,300,019 | 1/1967 | Brigham, et al. | 101/40 UX |
| 3,315,780 | 4/1967 | Karlyn | 101/40 UX |
| 3,548,745 | 12/1970 | Sirvet et al. | 101/40 |
| 3,563,170 | 2/1971 | Cvacho et al. | 101/40 |
| 3,567,043 | 3/1971 | Sirvet et al. | 101/40 UX |
| 3,586,175 | 6/1971 | Gould | 101/40 UX |
| 3,766,851 | 10/1973 | Sirvet et al. | 101/40 |

*Primary Examiner*—Clifford D. Crowder
*Attorney, Agent, or Firm*—Kyle W. Rost

[57] ABSTRACT

The continuous can printer and transfer apparatus is provided with infeed means devoid of moving parts, whereby cans move in a guided path by gravity through an inclined chute to stationary pockets on a rotatable pocket mandrel wheel where they are drawn from the pockets and seated by vacuum on mandrels which carry the cans to a printing blanket cylinder. Before contacting the rotating printing blanket, the surface speeds of the mandrel and printing cylinder are precisely matched by a pre-spin belt on the printing cylinder and rollers. Decorated cans are transferred to suction cups on a transfer wheel and discharged to a pin chain conveyor by a transfer assembly wherein all motions of the transfer cups are controlled in a radial and axial direction by a single cam motion.

10 Claims, 7 Drawing Figures

CONTINUOUS GRAVITY FED CAN PRINTER AND TRANSFER APPARATUS

This is a continuation of application Ser. No. 619,597, filed on Oct. 6, 1975 now abandoned.

BACKGROUND OF THE INVENTION

This invention relates to a method and means for feeding and discharging cylindrical cans in a printing machine. The major elements of such printers comprise infeed mechanism, loading means for placing cans on mandrels, a printing blanket wheel for transfering an image from the blanket cylinder to a container, and transfer mechanism for moving decorated cans to pins of a chain conveyor for passage through a curing and drying oven.

Infeed mechanisms heretofore have comprised a star wheel for delivering cans successively to a pocket wheel, as in U.S. Pat. No. 3,261,281; or have comprised a combination of elements, namely, a star wheel and a screw conveyor, as in U.S. Pat. No. 3,766,851. The infeed mechanism carried cans to a pocket or cradle wheel provided with pockets for holding cans in axial alignment with mandrels on a mandrel wheel. Pockets or cradles disclosed in the aforementioned patents are either retractable in radial directions or movable in axial directions to carry cans to mandrels. The mechanism shown in U.S. Pat. No. 3,016,153 employs push rods moving in axial directions to place cans on mandrels and also for transferring decorated cans from the mandrels to a pin chain conveyor. In the prior art constructions, the infeed means utilized various moving parts, and the discharge means employed double cams and complex mechanisms for transferring decorated cans to a pin chain conveyor.

SUMMARY OF THE INVENTION

The invention relates to a can printer and transfer mechanism in which the infeed means is devoid of a star wheel, screw conveyor, and other moving parts. Cans are conveyed directly from a conventional supply line to a chute through which cans fall by gravity into pockets of a pocket wheel. The pockets on the peripheral surface of the pocket wheel are contoured to receive cylindrical cans and are stationary relatively to the wheel but are carried bodily with the wheel when it is rotated. Cans in the pockets are axially opposite mandrels mounted on the wheel referred to hereinafter as a pocket mandrel wheel. A spring shoe contacts the closed end of each can as it leaves the chute and this, combined with vacuum applied through the mandrel opposite each can, draws and seats the can on the mandrel.

Rotation of the pocket mandrel wheel carries the cans into contact with the blanket cylinder. Just before printing contact, the end of the can mandrel is contacted by a pre-spin belt which brings the can up to surface speed of the blanket cylinder to ensure precisely matched speeds.

Another feature of the invention is the transfer mechanism by which decorated cans are transferred from mandrels to the pins of a chain conveyor which carries the cans through the curing and drying oven. The transfer mechanism comprises suction cups on a wheel and operative mechanism wherein all motions of said cups are controlled in a radial and axial direction by a single cam motion as opposed to other mechanisms requiring double cams and complex mechanisms.

OBJECTS OF THE INVENTION

An object of the invention is to eliminate the star wheels, screw conveyors, push rods and other moving parts heretofore employed for moving cans from a supply line to mandrels which carry the cans to a printing cylinder to be decorated.

Another object is to deposit cans in the pockets of a pocket mandrel wheel without employing moving parts and to draw and seat the cans on mandrels without requiring movable pockets to locate the cans axially opposite and adjacent mandrels for such seating.

Another object is to provide means for producing precisely matched surface speeds of rotation of the can mandrels and printing cylinder before each can comes into printing contact with the printing cylinder.

Another object is to provide transfer means for transferring decorated cans from mandrels to suction cups on a transfer wheel which carry them to the pins of a chain conveyor and drop them onto said pins for passage through an oven, said transfer means comprising mechanism which controls all motions of the cups in a radial and axial direction by a single cam motion.

Still another object is to substantially increase speed of operation, and to decrease cost of printing containers by increased speed, lessened repair and maintenance expense, simplified construction and greater efficiency obtained from elimination of moving parts and novel transfer mechanism.

DESCRIPTION OF THE PREFERRED EMBODIMENT

Figure 1:
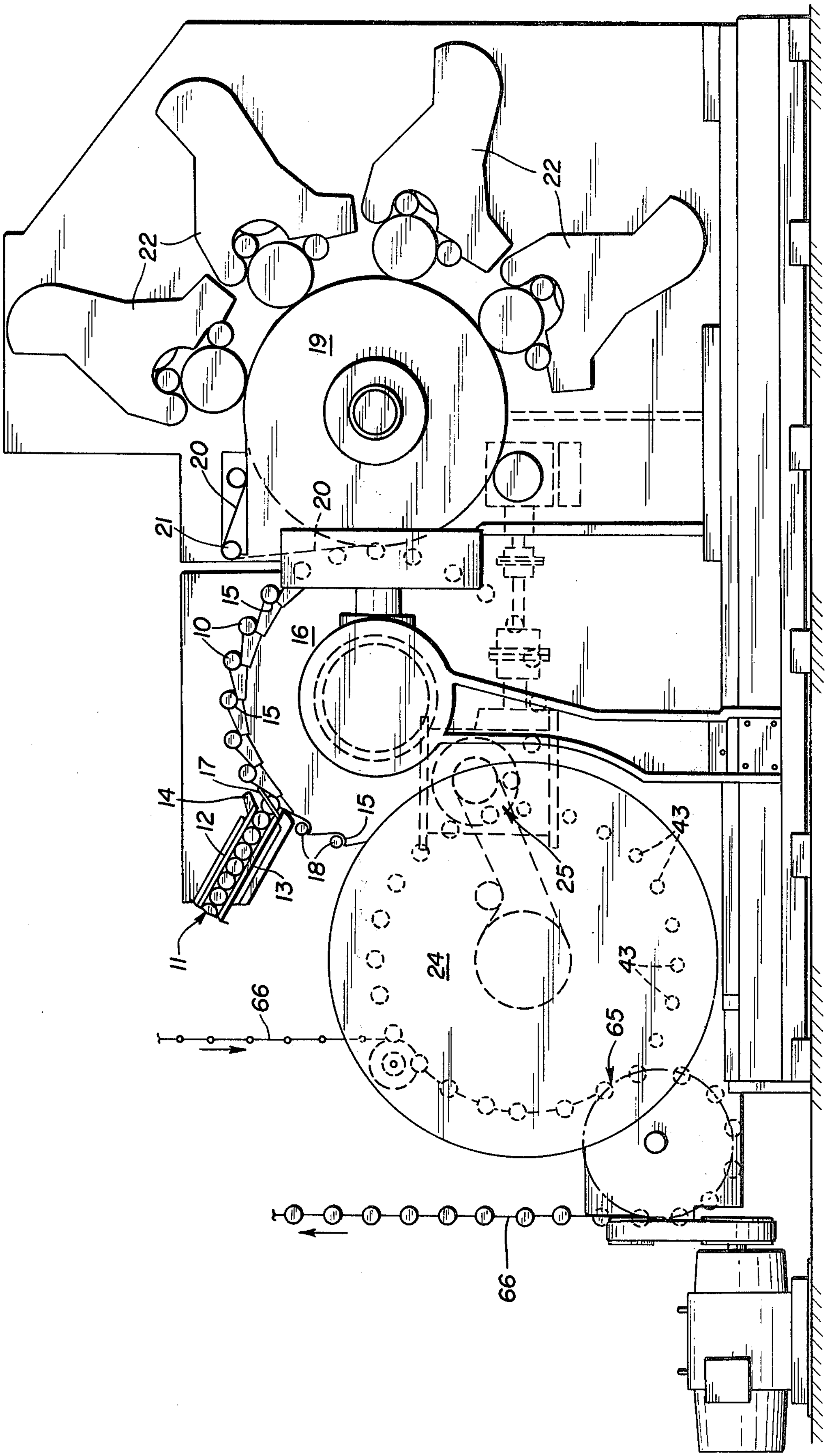
FIG. 1 is a front elevational view of a can printing machine embodying the invention.

Cans 10 are cylindrical, provided with one closed end and an opposite open end. The cans are fed from a conventional track system to an inclined infeed chute 11 through which they move by gravity. The chute is provided with guide rails 12, 13, and top guide 14. Cans pass into pockets 15 of a pocket mandrel wheel 16. As the wheel is rotated past the infeed chute, the can rolls down the profiled infeed guides and contoured pocket surface until it is fully seated in the pocket 15. There are no moving parts to wear, and correct infeed timing is accomplished by the pocket and its contour. The closed end of each can is contacted by a spring shoe 17 which guides the can toward a mandrel 18 on wheel 16.

Vacuum is applied through the mandrel 18 and, with the guiding aid of the spring shoe 17, draws and seats the can on the mandrel 18 opposite the open end of the can. Rotation of the pocket mandrel wheel 16 in clockwise direction carries the can into contact with the printing blanket cylinder 19 where the image is transferred to the can 10.

Just before the printing contact, the end of the mandrel 18 is contacted by a pre-spin belt 20 on rollers 21 which brings the can on the mandrel to surface speed of the blanket cylinder 19. The belt is wrapped around and is driven by the blanket cylinder 19 to ensure precisely matched surface speeds. The rollers 21 maintain tension on the belt 20. Ink is transferred to the blanket cylinder by inkers and plate cylinder 22. Four such inking stations are used in this machine.

Decorated cans are transferred from the pocket mandrel wheel 16 to suction cups on the transfer wheel 24. The transfer area is indicated at 25 on FIG. 1.

Figure 2:
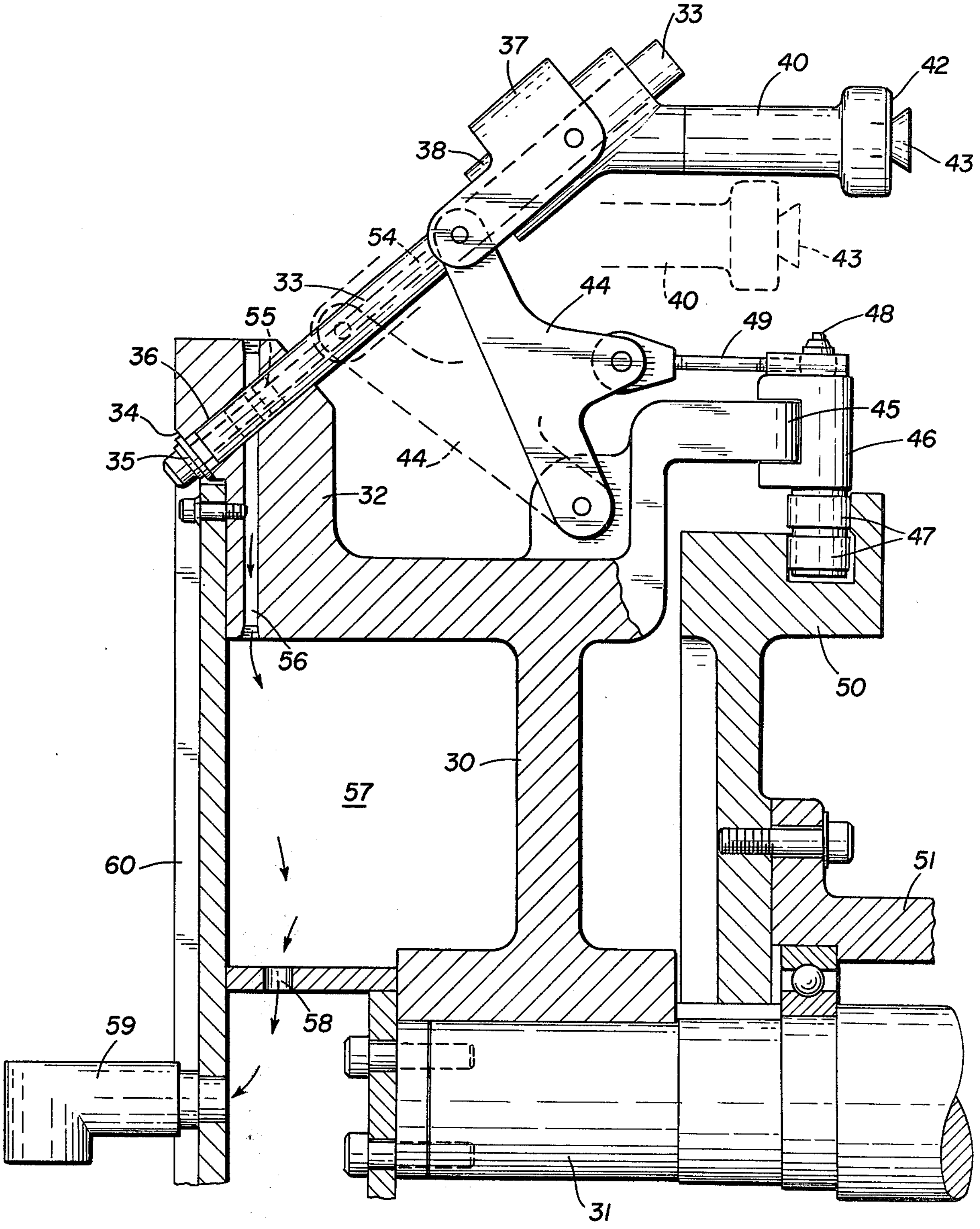
FIG. 2 is a sectional view of one of the transfer stations whereby decorated cans are transferred from a pocket mandrel wheel to suction cups on a transfer wheel.
Figure 3:
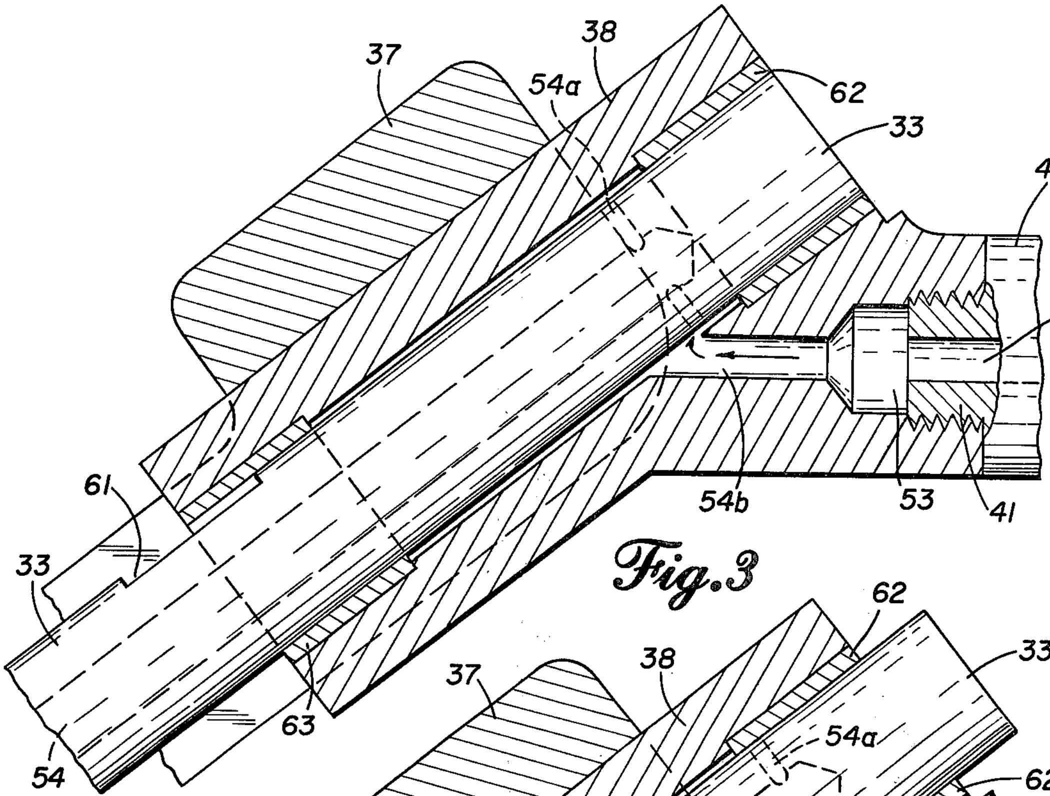
FIGS. 3 and 4 are sectional views of a transfer vacuum head showing valving details.
Figure 4:
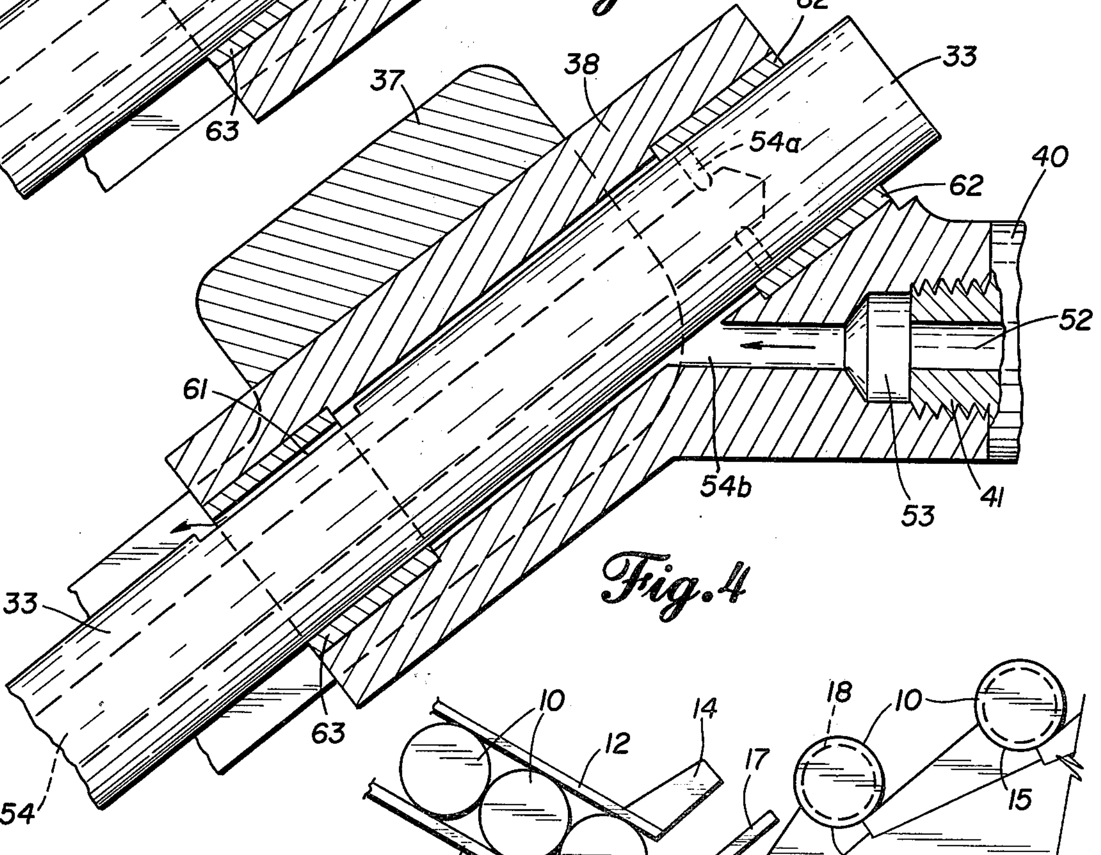

FIG. 2 shows one of the transfer stations. The transfer wheel 24 consists of 24 stations to ensure adequate time for transfer. The hub 30 is locked to a cantilevered shaft 31 which is driven in time with the pocket mandrel wheel 16. The flange 32 of the wheel hub 30 carries an angled slide shaft 33 secured by shoulder 34 and screw and washer 35 in bore 36. A housing 37 is slidably carried by sleeve portion 38 on shaft 33 and in turn carries vacuum head 40 and screw 41. The opposite end of the head 40 carries a rubber bumper 42 and rubber suction cup 43. Link 44 is pivotally attached to the housing 37. A scalloped hub portion 45 carries a pivotally mounted arm 46 which carries a pair of cam follower rollers 47 supported on shaft 48. The opposite end of the shaft 48 carries a coupling 49 pivotally attached to the link 44. The followers 47 ride in box cam 50 which is secured against rotation by shaft support hub 51. Rotation of hub 30 causes cam followers 47 to ride up and down the swells of cam 50, thus rotating arm 46. Movement of this arm causes link 44 to pivot through coupling 49 and slide housing 37 down shaft 33, thus displacing suction head 40 in both axial and radial direction.

To transfer the decorated can 10 from the mandrels 18 to the transfer wheel 24, the can is blown off the mandrel 18 onto the suction cup 43 of the transfer suction head 40 where it is held by vacuum. Vacuum is applied to cup 43 through passages 52, 53, in said head, passages 54 and 55 in shaft 33, passage 56 in hub 30, chamber 57, passage 58 in hub 30, and rotary valve 59 connected to a source of vacuum. The rotary valve 59 is screwed into an end plate 60 bolted to hub 30 to form chamber 57. This chamber acts as a vacuum manifold, thereby placing a large volume of vacuum as close to the vacuum head 40 as possible.

During the transfer operation, cam followers 47 follow the path of the box cam 50 and cause link 44 to pivot in a counter-clockwise direction, thereby causing housing 37 to slide down shaft 33. The resultant radial motion of the cup 43 causes it to take a path coinciding with the path of the mandrel 18. At the beginning of this common path, in the transfer area 25, air is blown through the mandrel to displace the can from the mandrel to the cup. The resultant axial motion of the cup removes the can completely clear of the mandrel. During this time, vacuum is applied to the suction head 40 through passages 54, 54*a* and 54*b* and through passages 53 and 52 to suction cup 43. Bushings 62 and 63 seal vacuum in this position.

As the can on the transfer wheel comes into the unloading area, the contour on cam 50 causes housing 37 to slide further down shaft 33. As the head 40 reaches unload point 65, vacuum passage is blocked by bushing 62. As housing 37 continues to retract, cut out 61 on shaft 33 straddles bushing 63, thereby venting passage 53 to atmosphere and breaking vacuum. At this point the pin chain 66 carries the can off the suction cup and on through the oven for drying.

Figure 5:
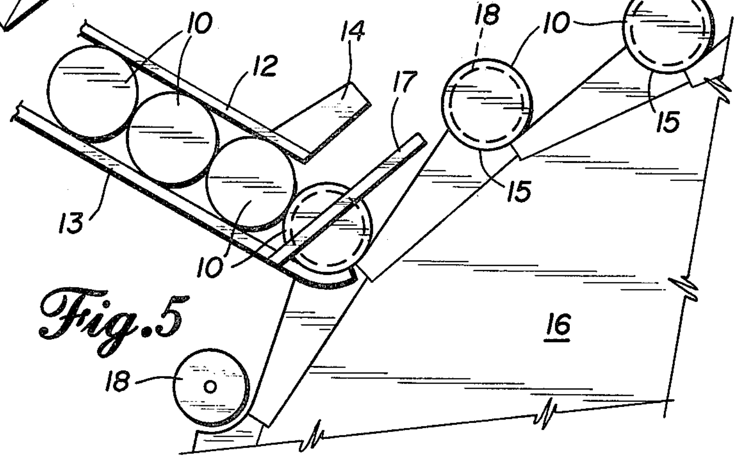
FIG. 5 is a fragmentary elevational view of part of the infeed means.
Figure 6:
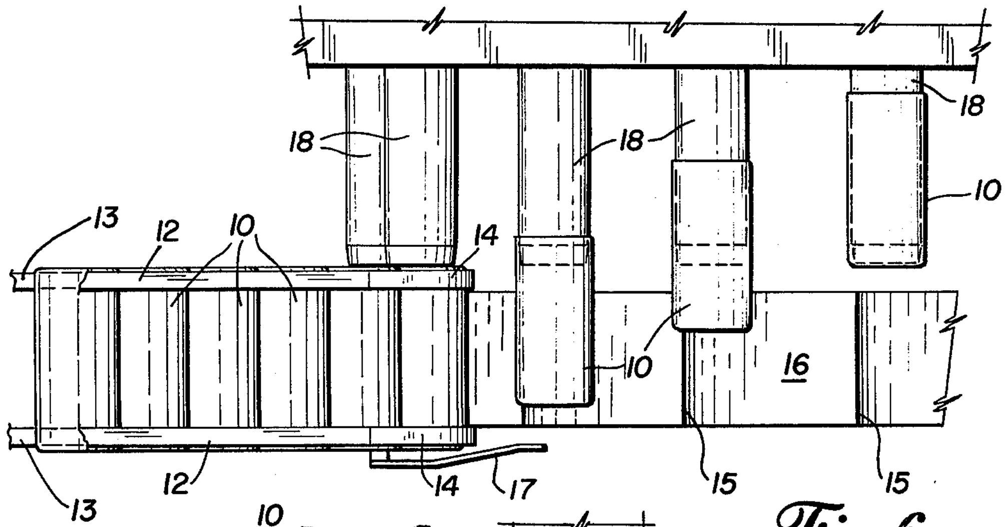
FIG. 6 is a top view of the container load area of FIG. 1, on an enlarged scale.
Figure 7:
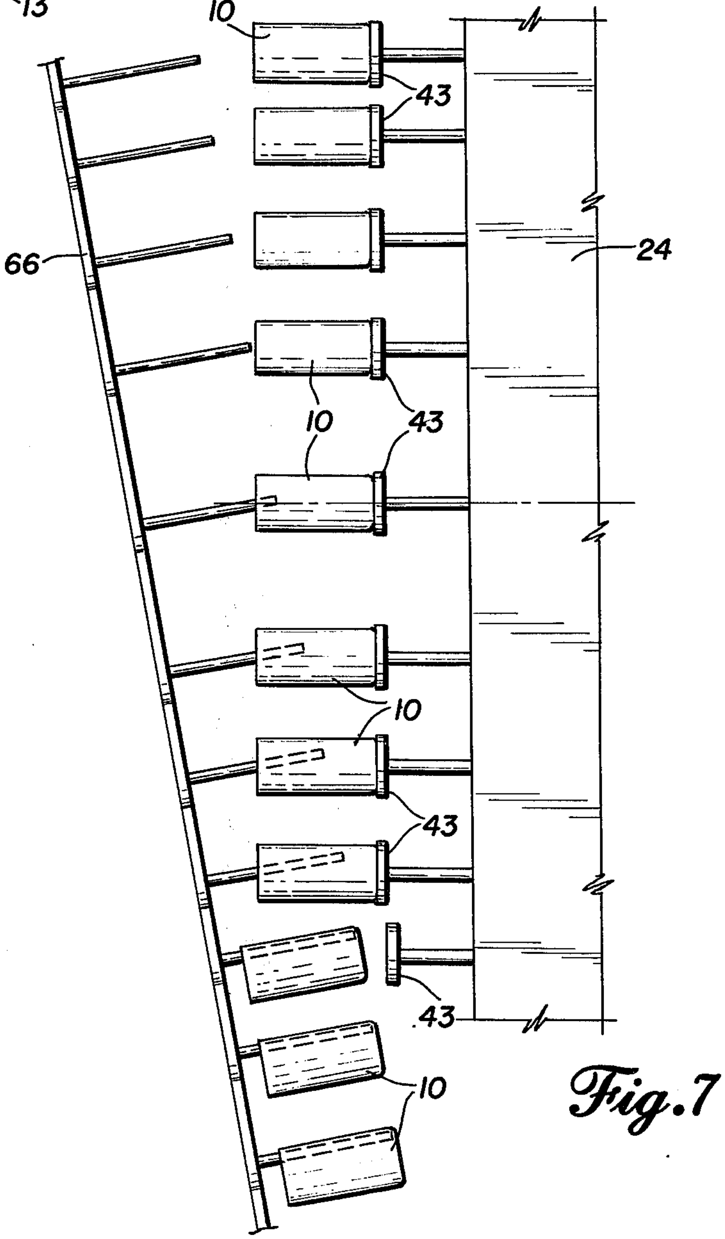
FIG. 7 is an elevational end view, on an enlarged scale, of the means for transferring decorated cans to a pin chain.

As best shown on FIG. 5, the pockets 15 in the peripheral surface of the rotating wheel 16 have a leading surface which slopes gradually downwardly to a can seating surface limited by a circular surface corresponding in cross section to a segment of the can circumference.

As best shown in FIG. 1, the infeed chute 11 runs toward the pocket mandrel wheel along a nonradial path, with respect to the wheel. If the path of the chute were projected through the wheel, it will be seen that the path would pass over the central axis of the wheel, or to state the matter in another way, the path would form an oblique angle with a tangent to the wheel at the point of intersection of the chute path and the wheel. Referring again to FIG. 5, it can be seen that the circumferential surface of the pocket wheel is inwardly scalloped in appearance as viewed in this figure, each of the inward depressions forming a pocket and the pockets being continuously adjacent around the wheel. The infeed chute has an outlet portion that extends into the cylindrical plane of wheel rotation for substantially the depth of a pocket, as can be seen by the terminal curved portion of lower rail 13 in FIG. 5. This curved portion curves in the direction of pocket wheel rotation, which is clockwise in FIG. 5, directing the cans in the direction of pocket wheel movement as they leave the chute by gravity.

The leading edge of each pocket 15 slopes downwardly and allows the cans from a continuous row of cans in the infeed chute to fall into the pockets under force of gravity as the leading surface rotates past the can infeed chute, resulting in the leading surface receding below the falling can as the can enters the pocket. The trailing surface of each pocket contacts the entering can at the point where the can is at the bottom of the pocket and moves the can with the rotation of the wheel, allowing the next successive can to begin to fall into the next successive pocket.

The method of feeding and discharging cans in a printing and transfer apparatus, according to this invention, comprises feeding cans successively from a supply source directly to said stationary pockets 15 of the rotating pocket wheel 16 in a guided path by gravity, said infeed means and pockets being free of moving parts. The wheel has a mandrel opposite each pocket. Spring means contact each can when it enters a pocket to start the can to move axially onto the mandrel while vacuum is applied through the mandrel, drawing and seating the can on the mandrel. The can is printed while held on the mandrel. After printing, the decorated can is blown off the mandrel onto a suction cup on a suction head which is part of a transfer assembly on a rotating transfer wheel. Movement of the suction head and cup radially downwardly on an angled shaft mounted on said rotating transfer wheel moves the cup in a path coinciding with the path of the mandrel, and blowing air through the mandrel at the beginning of the coinciding path displaces the can from the mandrel to the suction cup where it is held by vacuum. Movement of the suction cup and head further down on the angled shaft blocks vacuum passage, releases the can from the cup and places it on a pin of a chain conveyor. All motion of the housing 37 carrying the vacuum head and cup 43 is in a radial and axial direction, accomplished by a single cam action.

We claim:

1. In a continuous can printer and transfer apparatus of the kind having a rotating mandrel wheel carrying cans being decorated and having a rotating transfer wheel for transferring the decorated cans from the mandrels of the mandrel wheel to the pins of a pin chain conveyor, an improved transfer wheel comprising:

(a) a hub driven in time with the mandrel wheel on an axis substantially parallel to the axis of the mandrel wheel;

(b) an angled shaft carried by the hub, the angle of the shaft having a radial component and an axial component relative to the axis of the hub;

(c) a vacuum head and suction cup assembly slidably mounted for movement along the axis of said angled shaft in combined radial and axial directions with respect to said hub, the axis of the vacuum head and suction cup maintaining a fixed angular relationship to the axis of the hub;

(d) means for moving said vacuum head and suction cup assembly along the angled shaft, displacing the assembly both radially and axially with respect to the hub for tracking the path of a mandrel on said mandrel wheel during the transfer of a can from the mandrel to the vacuum head and suction cup assembly, and (e) vacuum source means supplying vacuum to said vacuum head at predetermined points of transfer wheel rotation, the vacuum holding the transferred can on the suction cup during a portion of transfer wheel rotation.

2. The invention defined by claim 1, wherein said means for moving the vacuum head and suction cup assembly comprises a single cam and cam follower connected to said vacuum head and suction cup assembly for causing both axial and radial motion of the assembly through the contour of the single cam.

3. The invention defined by claim 2, further comprising a sleeve slidably mounted on said angled shaft and directly carrying the vacuum head and suction cup assembly, a housing pivotally mounted on said sleeve, a link pivotally connected at one end to said hub and at the opposite end to the housing and having a coupling pivotally mounted between said ends and connected to said cam follower for transmitting motion of the cam follower to the link, causing both axial and radial motion of the vacuum head and suction cup assembly through the motion imparted by said single cam.

4. The invention defined by claim 2 wherein said cam is contoured to produce radial motion of the combined radial and axial motion of the vacuum head and suction cup to alone cause the cup to travel in a path coinciding with an arc of the path of a mandrel.

5. An improved continuous can printer and transfer apparatus of the kind having a downwardly inclined infeed chute through which cans move from a source of supply to a rotatable pocket mandrel wheel that receives each can in a pocket on the circumference of the wheel, each pocket having a mandrel axially opposite the pocket, wherein the improvement comprises:

(a) said infeed chute angling toward the pocket mandrel wheel in a nonradial path creating an obtuse angle between the chute and a tangent line at the intersection of the chute and the wheel in the direction of wheel rotation, the infeed chute having an outlet portion for substantially the depth of a pocket within the circumference of the wheel, the output portion of the chute curving in the direction of pocket movement to direct the cans in the direction of pocket movement as they leave the chute, the chute being devoid of moving parts and the cans moving through the chute by gravity;

(b) said rotatable pocket mandrel wheel having a plurality of continuously adjacent pockets on its circumference, each pocket being smoothly contoured with a leading and a trailing surface, the leading surface sloping downwardly toward the trailing surface to recede under the path of a can in a continuous row of cans entering the pockets as guided by the infeed chute and force of gravity as the wheel rotates to receive the cans in successive pockets, and each pocket having a can-seating trailing surface having a circular cross-section corresponding to a segment of the can circumference for contacting the can at the bottom of the pocket and moving the can with the rotation of the pocket mandrel wheel; and (c) means for resiliently urging each can seated in a pocket onto said axially opposite mandrel.

6. A high-speed continuous can handling apparatus comprising a can infeed track guiding cans under force of gravity from a source of supply to a rotatable pocket wheel having pockets on its circumferential surface, said track angling toward the wheel in a nonradial path and forming an oblique angle with a tangent to the wheel at the intersection of the track and the wheel in the direction of wheel rotation, the track having an outlet portion that curves in the direction of wheel rotation and extends into the pocket area for the depth of said pockets to redirect the path of the cans closer to the path of the pockets moving with the wheel; said pocket wheel having continuously adjacent pockets on its surface, each pocket having a leading and a trailing surface, the leading surface being smoothly contoured to recede under the path of a can entering the pocket from a continuous succession of cans guided toward the pocket wheel by the can track and under force of gravity as the wheel rotates, and without substantially interfering with the gravity induced motion of the can, said trailing surface contoured in an arcuate segment to seat the can and move it away from the infeed tract with the rotation of the wheel when the can is fully in the pocket.

7. The high-speed can handling apparatus of claim 6 wherein said pocket wheel further comprises a mandrel axially aligned with each pocket for receiving the can from the pocket and supporting the can during contact with a rotatable printing blanket cylinder for decorating the can exterior; a vacuum source in each mandrel for drawing the can onto the mandrel; and a flexible spring element mounted adjacent the pocket wheel and contacting each can seated in the pocket to urge the can axially in the pocket while said vacuum is applied through the mandrel to draw and seat the can on the mandrel.

8. In a method of feeding cans in a continuous high-speed can handling apparatus of the kind having can infeed means guiding cans to a rotating pocket wheel, the improvement comprising:

(a) feeding a continuous succession of cans by gravity along a guided nonradial path into the pockets of said pocket wheel, the path intersecting the surface of the wheel in an oblique angle with a tangent to the wheel at the point of intersection in the direction of wheel rotation;

(b) gradually redirecting the cans into the direction of pocket movement on the wheel as the cans enter the pocket area;

(c) continuously receiving cans in the pockets of the pocket wheel without substantially altering the gravity induced motion of the cans until they are fully seated in the pockets, the pockets being continuously adjacent on the circumference of the wheel;

(d) engaging the can with a trailing surface of the pocket contoured to the approximate shape of a segment of the can circumference; and (e) carrying the can away from the supply source as the wheel rotates, the can being seated in the pocket.

9. The method of feeding and discharging cans in a continuous printing and transferring apparatus, comprising:

(a) feeding cans successively in a guided path by gravity directly to pockets which are free of moving parts and mounted stationarily on a rotating pocket mandrel wheel in positions axially opposite mandrels on said wheel;

(b) contacting each can with a flexible spring member after it enters a pocket for guiding it to a mandrel;

(c) applying vacuum through the mandrel for drawing and seating the can on the mandrel;

(d) printing the cans on the mandrels;

(e) moving a suction cup, which is slidably mounted on an angled shaft connected to a transfer assembly that rotates on a hub having an axis substantially parallel to the axis of said pocket mandrel wheel, in a path radially of the transfer assembly and coinciding with the path of the mandrel, the angled shaft being angled both axially and radially to the axis of said hub;

(f) blowing air through the mandrel at the beginning of the coinciding path to displace the can from the mandrel to the suction cup;

(g) applying vacuum through the suction cup to hold the can on the cup;

(h) moving the pin of a chain conveyor into the can held on the suction cup; and (i) breaking the vacuum holding the can, discharging the can to the pin of a chain conveyor.

10. An improved method of feeding cans in a continuous printing and transferring apparatus of the kind having a gravity infeed guiding cans from a supply source to a continuously rotating pocket mandrel wheel, wherein the improvement comprises:

(a) moving the cans along a guided nonradial path with respect to the axis of the pocket mandrel wheel into the area of rotation of the pockets on said wheel, the path being oblique to a tangent to the wheel at the point of intersection with the wheel;

(b) redirecting each can into the direction of pocket movement while the can is entering the pocket area but before the can is substantially displaced from said gravity infeed by the pocket;

(c) continuously receiving cans in the pockets of the pocket mandrel wheel without substantially altering the gravity induced motion of the cans until they are fully seated in the pockets, the pockets being continuously adjacent on the circumference of the wheel;

(d) engaging the can with a trailing surface of the pocket contoured to the approximate shape of a segment of the can circumference to carry the can away from the infeed;

(e) axially urging the cans from the pockets toward axially aligned mandrels by resilient means; and (f) applying vacuum through the mandrel while the can is thus urged to draw and seat the can on the mandrel.

* * * * *